United States Patent [19]

January

[11] Patent Number: 4,472,510

[45] Date of Patent: Sep. 18, 1984

[54] CARBON-CONTAINING MONOLITHIC GLASSES AND CERAMICS PREPARED BY A SOL-GEL PROCESS

[75] Inventor: James R. January, Midland, Mich.

[73] Assignee: Dow Corning Corporation, Midland, Mich.

[21] Appl. No.: 452,693

[22] Filed: Dec. 23, 1982

[51] Int. Cl.$^3$ .................... C03B 19/00; C03B 19/02; C03C 3/04
[52] U.S. Cl. .................................. 501/12; 65/17; 65/18.2; 252/629; 428/428; 501/1; 501/11; 501/32; 501/53; 501/54; 501/55; 501/68; 501/73; 501/87; 501/128
[58] Field of Search .................... 501/12, 55, 128, 87; 428/412, 428, 447, 446; 65/134, 17, 18.1, 18.2

[56] References Cited

U.S. PATENT DOCUMENTS

| | | | |
|---|---|---|---|
| 3,640,093 | 2/1972 | Levene et al. | 65/134 |
| 3,681,113 | 8/1972 | Yoldas | 117/46 |
| 3,811,918 | 5/1974 | Levene | 117/47 |
| 3,816,163 | 6/1974 | Yoldas | 117/46 |
| 3,941,719 | 3/1976 | Yoldas | 252/463 |
| 3,944,658 | 3/1976 | Yoldas | 423/626 |
| 4,027,073 | 5/1977 | Clark | 428/447 |
| 4,225,635 | 9/1980 | Yoldas | 427/106 |
| 4,275,118 | 6/1981 | Baney et al. | 428/412 |
| 4,324,576 | 4/1982 | Matsuyama et al. | 501/12 |
| 4,338,375 | 7/1982 | Hashimoto et al. | 428/412 |
| 4,346,131 | 8/1982 | Yoldas | 428/428 |
| 4,358,507 | 11/1982 | Senaha et al. | 428/412 |
| 4,367,262 | 1/1983 | Vaughn | 428/412 |
| 4,368,235 | 1/1983 | Vaughn | 428/412 |
| 4,368,241 | 1/1983 | Ching | 428/412 |
| 4,379,196 | 4/1983 | Halper | 428/428 |
| 4,390,373 | 6/1983 | White et al. | 428/412 |
| 4,395,461 | 7/1983 | Ching | 428/412 |
| 4,395,463 | 7/1983 | Kray | 428/412 |

FOREIGN PATENT DOCUMENTS 2083451A  3/1982  United Kingdom .

OTHER PUBLICATIONS

Journal of Materials Science 13, (1978), 865–870.
Journal of Materials Science 14, (1979), 607–611.
Ceramic Bulletin, vol. 59, No. 4, (1980), 479–483.
Journal of Materials Science 15, (1980), 2937–2939.

Primary Examiner—Helen M. McCarthy
Attorney, Agent, or Firm—Richard A. Kaba

[57] ABSTRACT

What is disclosed is a method of preparing carbon-containing monolithic glassy ceramics from organosilsesquioxanes, metal oxides and metal alkoxides through pyrolysis of their gels. Also disclosed are certain gel compositions used in the method and the glassy ceramics.

89 Claims, No Drawings

CARBON-CONTAINING MONOLITHIC GLASSES AND CERAMICS PREPARED BY A SOL-GEL PROCESS

BACKGROUND OF THE INVENTION

Inorganic oxides are relatively important constituents of many of the modern technological products in use today. They are especially important in the ceramics and glass industries and have been under investigation for many years for many varied uses.

Typically, solid melting techniques were used to blend inorganic oxides to make glass or ceramics. Thus, oxides were, and still are for most applications, ground up into fine particles, with silicon dioxides being the major constituent in most cases, and incorporated into glass matrices by melting and blending at temperatures of up to 2000° C. Not only is this process cumbersome but the method leads to products with different phases causing inhomogeneity in the product which leaves a physical weakness in the final product.

Also, owing to the melting method's inefficiency, only certain applications can be undertaken, as the very high temperatures used to ceramify the glasses also limits the types of substrates that can be used. Moreover, the method consumes tremendous amounts of energy.

PRIOR ART

The traditional melting method for obtaining glasses has been substituted in part by a method for obtaining glasses which has, as a significant feature, the ability to obtain glasses at low temperatures. In the mid-1970's several investigators were involved in this new process, now called the sol-gel process. The advantages, according to the investigators, are several-fold. For example, the new method leads to homogeneous products because of the fact that the precursor materials are liquids and blendability is enhanced using liquids as opposed to solids. Also, the sol-gel process allows low temperature operation to acquire the gels, which leads to cost-savings and less hazards in handling the materials. The new sol-gel process also allows the preparation of purer glassy products because it is possible to distill the starting materials that go into the preparation of the sol.

Attempts at defining what the sol-gel process could accomplish came in a disclosure by Bulent Yoldas in U.S. Pat. No. 3,681,113, issued Aug. 1, 1972. A companion patent to Yoldas issued June 11, 1974 as U.S. Pat. No. 3,816,163. Yoldas disclosed the use of a gel-free solution of a hydrolyzed and partially condensed silicon polymer which he had prepared from tetrafunctional silanes. Such materials were non-carbon containing and were used for treating porous refractory bricks. These materials were neither sols nor gels but were the precursor materials from which sols and gels were eventually made by Yoldas and others. What is important about the disclosure is that it showed that there was a liquid path to useful metal oxides that did not lead to unexpected, intractable solids in the sol stage.

Subsequent to this disclosure, in U.S. Pat. No. 3,941,719, issued Mar. 2, 1976, Yoldas disclosed the preparation of a stable alumina sol-gel which he was able to convert to alpha alumina by heating. A companion patent to Yoldas issued Mar. 16, 1976 as U.S. Pat. No. 3,944,658. Shortly thereafter, three Japanese investigators disclosed the details of what occurs in the sol, and the gel, during the preparation of the sol and the gel and the conversion of the gel to a glass (Masayuki Yamane, Shinji Aso and Tervo Sakaino, Journal of Materials Science 13 (1978) 864–870 and Journal of Materials Science 14 (1979) (607–611)

The years 1980 and 1981 were very prolific years in terms of the numbers of investigators studying the sol-gel process. Yoldas, in U.S. Pat. No. 4,225,635, issued Sept. 30, 1980, disclosed the preparation and use of a boron alkoxide/silicon alkoxide sol-gel for coating vitreous silica substrates and two Japanese investigators, Kanichi Kamiya and Sumio Sakka, Journal of Materials Science 15 (1980) 2937–2939 disclosed the preparation of $TiO_2/SiO_2$ glasses starting with metal oxides. Yoldas, in Ceramic Bulletin, Vol. 59, No. 4 (1980) 479–483 disclosed the use of silicon tetraethoxide and aluminum sec-butoxide to form monolithic materials from a sol-gel process. Kamiya, Sakka and others (above) disclosed the preparation of glass films from sol-gels of silicon alkoxides and other metal alkoxides.

Finally, in terms of compositions, Levene, in U.S. Pat. No. 3,640,093, issued Feb. 8, 1972, disclosed the combination of silicon alkoxides, which are partially hydrolyzed, with metal alkoxides and/or metal salts, to form clear organic solvent solutions which are convertible to clear gels and in Levene, U.S. Pat. No. 3,811,918, there is disclosed a combination of partially hydrolyzed silicon alkoxides, metal alkoxides and metal compounds to form clear organic solvent solutions which are then converted to glass coatings. It should be noted that both Levene patents disclose carbon containing silicon alkoxides as $SiX_nY_{4-n}$ wherein X is hydrogen, phenyl or an alkyl of 1 to 6 carbon atoms but do not disclose the aqueous colloidal solutions of the materials with other metal oxides nor does Levene disclose the eventual firing of these compositions in an inert atmosphere or a vacuum. Levene shows a careful step-by-step approach to obtain partially hydrolyzed silicon alkoxides which are then further reacted with metal alkoxides to form metallosiloxanes which are eventually fired in air to give granular oxide products. It should be especially noted that Levene's materials are non-aqueous, solvent solutions as opposed to the compositions of the instant invention.

There are no examples in either of the Levene patents which deal with the use of carbon containing silicon alkoxides, wherein the carbon is bonded directly to the silicon atom. The inclusion of carbon in this form changes the molecule considerably and this change leads to entirely new products. The fact that the pyrolysis of the gels is carried out in an inert atmosphere, as opposed to air, also leads to different products having different properties.

THE INVENTION

The inventor herein discloses as his invention, carbon-containing monolithic glasses which are prepared by pyrolyzing gels in an inert atmosphere, which gels are prepared from solutions or sols which solutions or sols are prepared by hydrolyzing carbon-containing silicon alkoxides in combination with colloidal metal oxides or metal alkoxides. Certain of the solution or sol compositions useful in this invention are themselves, new and novel compositions of matter. What is meant by "carbon-containing" in this invention is that the carbon is bonded directly to the silicon atoms in the molecules.

For purposes of this invention, the words "sol" and "solution" will be used interchangeably, recognizing that solutions and sols are different in physical characteristics. If one needs to know whether or not the composition is a sol or a solution, that fact can be easily noted by subjecting the liquid composition to a simple test which includes placing a glass vessel of the composition between one's line of vision and a strong light source. If the composition shows a bluish cast, then it is a true sol. This is known as the Tyndall effect. If the composition is clear, then it is a true solution.

Thus, one aspect of this invention is a method of preparing a monolithic glassy ceramic which comprises pyrolyzing in an inert atmosphere, or a vacuum, until a monolithic glassy ceramic is obtained, a product comprising a stable gel selected from a group consisting essentially of (A) a gel obtained from a sol of an organosilsesquioxane having the unit formula $$RSiO_{3/2}$$

wherein R is selected from a group consisting essentially of
  (a) $CH_2=CH-$;
  (b) $CH_2=CHCH_2-$;
  (c) $C_6H_5-$;
  (d) alkyl radicals of 1 to 4 carbon atoms;
  (e) substituted monovalent organic radicals and
  (f) mixtures of (a), (b), (c), (d), and (e);

(B) a gel obtained from a mixture of a sol of an organosilsesquioxane from (A), and a colloidal metal oxide or a mixture of colloidal metal oxides selected from a group consisting of essentially of
  (i) $SiO_2$
  (ii) $Al_2O_3$
  (iii) $ZrO_2$
  (iv) $TiO_2$
  (v) $SnO_2$
  (vi) $ZrSiO_4$
  (vii) $B_2O_3$
  (viii) $La_2O_3$ and
  (ix) $Sb_2O_5$;

(C) a gel obtained from a mixture of a sol of an organosilsesquioxane from (A), and a metal alkoxide, or a mixture of metal alkoxides having the general formula $$M(OR')_x$$

wherein M is any metal from a metal alkoxide which hydrolyzes and polymerizes in the presence of water, R' is an alkyl radical of 1 to 4 carbon atoms and x has a value equivalent to the metal ion valence.

This invention also relates to a method of forming a monolithic glassy ceramic coating on a solid substrate which comprises (I) coating a solid substrate with a sol selected from a group consisting essentially of
(A) a sol of organosilsesquioxane having the unit formula $$RSiO_{3/2}$$

wherein R is selected from a group consisting essentially of
  (a) $CH_2=CH-$;
  (b) $CH_2=CHCH_2-$;
  (c) $C_6H_5-$;
  (d) alkyl radicals of 1 to 4 carbon atoms;
  (e) substituted monovalent organic radicals; and
  (f) mixtures of (a), (b), (c), (d), and (e);

(B) a mixture of a sol or an organosilsesquioxane from (A), and a colloidal metal oxide or a mixture of colloidal metal oxides selected from a group consisting essentially of
  (i) $SiO_2$
  (ii) $Al_2O_3$
  (iii) $ZrO_2$
  (iv) $TiO_2$
  (v) $SnO_2$
  (vi) $ZrSiO_4$
  (vii) $B_2O_3$
  (viii) $La_2O_3$ and
  (ix) $Sb_2O_5$;

(C) a mixture of a sol or an organosilsesquioxane from (A), and a metal alkoxide, or a mixture of metal alkoxides having the general formula $$M(OR')_x$$

wherein M is any metal from a metal alkoxide which hydrolyzes and polymerizes in the presence of water, R' is an alkyl radical of 1 to 4 carbon atoms and x has a value equivalent to the metal ion valence;

(II) gelling the sol while the sol is on the solid substrate;

(III) drying the gel to remove volatile materials;

(IV) heat treating the gel to remove higher boiling volatiles, and (V) pyrolyzing the dried and heat treated gel at a temperature of 500° C. to 1500° C. in an inert atmosphere or a vacuum until a monolithic glassy ceramic coated substrate is obtained. Suitable solid substrates include metals, glasses, and ceramic substrates. Preferred metal substrates include silicon, steel, and aluminum.

This invention further relates to a method of forming a glassy ceramic coating on a solid substrate which comprises I. coating a solid substrate with a stable gel selected from a group consisting essentially of (A) a gel obtained from a sol of an organosilsesquioxane having the unit formula $$RSiO_{3/2}$$

wherein R is selected from a group consisting essentially of
  (a) $CH_2=CH-$;
  (b) $CH_2=CHCH_2-$;
  (c) $C_6H_5-$;
  (d) alkyl radicals of 1 to 4 carbon atoms;
  (e) substituted monovalent organic radicals; and
  (f) mixtures of (a), (b), (c), (d), and (e);

(B) a gel obtained from a mixture of a sol of an organosilsesquioxane from (A), and a colloidal metal oxide or a mixture of colloidal metal oxides selected from a group consisting essentially of
  (i) $SiO_2$
  (ii) $Al_2O_3$
  (iii) $ZrO_2$
  (iv) $TiO_2$
  (v) $SnO_2$ (vi) $ZrSiO_4$
(vii) $B_2O_3$
(viii) $La_2O_3$ and
(ix) $Sb_2O_5$;

(C) a gel obtained from a mixture of a sol of an organosilsesquioxane from (A), and a metal alkoxide, or a mixture of metal alkoxides having the general formula $$M(OR')_x$$

wherein M is any metal from a metal alkoxide which hydrolyzes and polymerizes in the presence of water, R' is an alkyl radical of 1 to 4 carbon atoms and x has a value equivalent to the metal ion valence;

II. drying the gel to remove volatile materials;

III. heat treating the gel to remove higher boiling volatiles; and

IV. pyrolyzing the dried and heat treated gel at a temperature of 500° C. to 1500° C. in an inert atmosphere or a vacuum until a monolithic glassy ceramic coated substrate is obtained. Suitable solid substrates include metals, glasses, and ceramic materials. Preferred metal substrates include silicon, steel, and aluminum.

The method in its general aspects constitutes the hydrolysis or cohydrolysis of certain organosilicon alkoxides either independently or in the presence of colloidal metal oxides or metal alkoxides; the formation of a sol from the hydrolyzate; the controlled formation of a gel from the sol and the eventual pyrolysis of the gel at higher temperatures in an inert atmosphere or a vacuum to form glasses or ceramics.

The glasses or ceramics formed by this method are essentially monolithic meaning they constitute one massive undifferentiated whole. The molecular make-up of the monolith is dependent on the type and form of the starting materials. One such type of starting material is the organosilsesquioxanes obtained from alkoxysilanes having the general formula $RSi(OR'')_3$, by hydrolysis, i.e. composition (A). Thus, $RSi(OCH_3)_3$, for example, can be hydrolyzed to give $RSiO_{3/2}$ and by-produced methanol. The $RSiO_{3/2}$ hydrolyzate is then subjected to aging, either with or without the use of heat to give a low molecular weight oligomer or short chain polymer which stays in solution. It may form a sol.

Thus, for purposes of this invention, R can be selected from the $CH_2=CH-$ radical; the $CH_2=CHCH_2-$ radical; alkyl radicals of 1 to 4 carbon atoms such as methyl, ethyl, propyl and butyl radicals; the phenyl radical; the substituted monovalent organic radicals, such as, for example

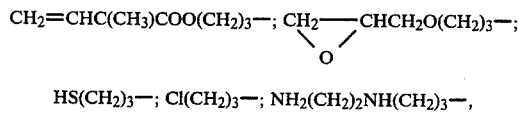

$HS(CH_2)_3-$; $Cl(CH_2)_3-$; $NH_2(CH_2)_2NH(CH_2)_3-$, and the like. These R groups can also be mixed; that is, R can be selected so as to give, for example, $CH_3SiO_{3/2}$ and $C_6H_5SiO_{3/2}$. There are a number of methods by which this sol can be made. For example, each alkoxysilane can be hydrolyzed separately and then the hydrolyzates can be combined with each other or the alkoxysilanes can be combined in the proper ratios and cohydrolyzed. When the hydrolysis is complete, the combined materials are then aged, either with or without the use of heat, to cause them to react and form a copolymeric material and a solution or sol.

A second type of starting material is a sol obtained from a combination of colloidal metal oxides and the organosilsesquioxanes described in (A), above. This is composition (B). There are a number of methods to achieve this combination. For example, the colloidal metal oxides can be mixed with the alkoxysilanes, for example, colloidal silica and $CH_3Si(OCH_3)_3$, and the water present in the colloidal metal oxide hydrolyzes the alkoxysilane to $CH_3SiO_{3/2}$ and by-produced methanol. Upon aging, the colloidal silica and the $CH_3SiO_{3/2}$ hydrolyzate react to form $-Si-O-Si-$ bonds. A second method to achieve this combination is to prehydrolyze the alkoxysilane and then combine this prehydrolyzate with the colloidal metal oxides and then age the materials to form a sol. It is contemplated within this invention that mixtures of colloidal metal oxides can be used.

A third type of starting material is a sol obtained from a combination of metal alkoxides and the organosilsesquioxane from the starting material set forth as composition (A), above. This combination is composition (C). There are a number of methods for obtaining this composition. The alkoxysilane precursors for the organosilsesquioxane can be combined with the metal alkoxides and cohydrolyzed. The cohydrolyzate is then aged, with or without the aid of heat, to give the sol. A second, more refined method, however, is to hydrolyze the metal alkoxides by themselves and then add them to the alkoxysilane precursors. The water from the metal alkoxide hydrolyzate then hydrolyzes the alkoxysilanes to the silsesquioxane and the two materials react during aging to form a copolymer and the sol. A third method for this composition is to hydrolyze each component separately and combine the hydrolyzates in the appropriate ratios, then age the combination to form the sol. It is contemplated within the scope of this invention that mixtures of metal alkoxides can be used.

For purposes of this invention, the hydrolysis step should be carried out in the presence of at least 1 equivalent of water for each equivalent of alkoxy attached to a metal atom of the starting materials. For purposes of this invention, whenever the word "metal" is used, it should also be construed to include "metalloids" such as, for example, silicon. It has been found that greater than 1 equivalent of water for each equivalent of alkoxy gives better sols, in that, the sols clear more rapidly, stay clear and more stable. Moreover, even though only one equivalent of water is required for hydrolysis, it is obvious that in order to form a sol, more water than is necessary for hydrolysis is required herein. One can expect good results upon hydrolysis when there is used at least 2 moles of water and up to 100 moles of water. Less than 1 equivalent of water per alkoxy group leads to insufficient hydrolysis of the alkoxy groups wherein the sol and eventually the gel will contain residual alkoxy groups which have been found detrimental in some formulations for some applicaions. Greater than 200 equivalents of water per equivalent of alkoxy on the metal atoms does not appear to lead to any significant improvements in the glassy ceramics.

To affect the hydrolysis, it has been found that solvents are helpful. In this invention it has been found that the best solvents are water-miscible solvents. It is preferred to use water-miscible alcohols herein or mixtures of water-miscible alcohols. Especially suitable are alcohols such as methanol, ethanol, n-propanol, isopropanol, n-butanol, isobutanol, t-butanol and lower molecular weight ether alcohols such as ethylene glycol monomethyl ether. Sometimes it is necessary to use small amounts of non-water-miscible solvents such as toluene.

Although these reactions can be carried out in basic pH's, the hydrolysis reactions generally require the use of an acidic pH in order to maintain the stability of the sols. Thus, for purposes of this invention, it is preferred to add organic or inorganic acids to the hydrolysis medium. Preferred for this invention is the addition of either acetic acid or hydrochloric acid. Depending on the particular composition that is being hydrolyzed, the pH could be as low as 1.5 or lower while it is appropriate to carry out some of the hydrolysis reactions at a pH of near 6. For example, the hydrolysis of composition (A) can take place at any pH less than 7. If the pH is 6 or less, the hydrolyzate is more stable and thus this hydrolysis is preferred to be carried out at less than a pH of 6. Composition (C), on the other hand, requires that the hydrolysis pH be 3, and preferably the pH should be less than 3. Raising the pH of the hydrolysis mixture leads to gelation. For example, if the hydrolysis is carried out at a pH of 3, the sol, if left standing at a pH of 5 would gel in about 30 days. If it were left standing at a pH of 8.5, it would gel in about 1 hour. Obviously, raising the pH to 10 causes almost immediate gelation. The details regarding the hydrolysis procedures herein can be found in the examples.

Alkoxysilanes useful in this invention are the silanes methyltrimethoxysilane, methyltriethoxysilane, methyltripropoxysilane, and methyltributoxysilane, phenyltrimethoxysilane, phenyltriethoxysilane, phenyltripropoxysilane, and phenyltributoxysilane.

The colloidal metal oxides useful in this invention are those colloidal metal oxides which are stable long enough to be able to combine them with the organosilsesquioxanes. Such colloidal metals oxides included in this invention are $SiO_2$, $Al_2O_3$, $ZrO_2$, $TiO_2$, $SnO_2$, $ZrSiO_4$, $B_2O_3$, $La_2O_3$ and $Sb_2O_5$. Preferred for this invention are $SiO_2$, $Al_2O_3$, $ZrO_2$, $TiO_2$, $SnO_2$, $ZrSiO_4$ and $B_2O_3$. Most preferred are $SiO_2$, $Al_2O_3$, $ZrSiO_4$ and $ZrO_2$. The latter three materials can be purchased in sol form from Nyacol Inc., Ashland, Mass., U.S.A and the silica can be purchased from Nalco Chemical Co., Oak Brook, Ill., U.S.A. Some of these colloidal sols are acidic in the sol form and therefore, when used in conjunction with this invention during hydrolysis, additional acid need not be added to the hydrolysis medium. These colloidal sols can also be prepared by a variety of methods. For example, titania sols having a particle size in the range of 5 to 150 millimicrons can be prepared by the acidic hydrolysis of titanium tetrachloride, by peptizing hydrous $TiO_2$ with tartaric acid and, by peptizing ammonia washed $Ti(SO_4)_2$ with hydrochloric acid. See Weiser, Inorganic Colloidal Chemistry, Vol. 2, p. 281 (1935). For purposes of this invention and in order to preclude the incorporation of contaminants in the sols, it is preferred to hydrolyze the alkyl orthoesters of the metals in an acid pH range of 1 to 3, in the presence of a water miscible solvent wherein the colloid is present in the dispersion in an amount of 0.1 to 10 weight percent.

The metal alkoxides useful in this invention are well-known chemical compounds that are used in a variety of applications. They have the general formula $M(OR')_x$ wherein M is any metal from a metal alkoxide which will hydrolyze and polymerize in the presence of water. R' is an alkyl radical of 1 to 4 carbon atoms and x has a value equivalent to the metal ion valence. Thus, contemplated within the scope of this invention are such metal alkoxides as $Ti(OR')_4$, $Al(OR')_3$, $Zr(OR')_3$ and $Sn(OR')_4$. Specifically, R' can be the methyl, ethyl, propyl or butyl radical. Preferred for this invention are the propoxy or butoxy materials. Most preferred are $Ti(isopropoxy)_4$, $Al(isopropoxy)_3$, $Al(sec-butoxy)_3$, $Zr(n-butoxy)_4$ and $Zr(n-propoxy)_4$.

The sols of this invention are first prepared from the starting materials as described above. The sols are generally transparent or translucent depending on their particular composition. For use in this invention, the sols are forced, under certain conditions, to gel. The gels are homogeneous when gelled. "Forcing the sols to gel under certain conditions" means that the sols are forced to gel by increasing the pH. The pH increase that is required to force this gelation is dependent upon the composition being gelled. For example, as indicated above, composition (C) types of materials are hydrolyzed and the sols form at a pH of less than 3. Generally, a few hours at a pH of 3 or slightly higher causes the sol to gel. Sometimes, the gelation of composition (C) type sols can be expedited by raising the pH slightly using solutions of dilute NaOH or ammonium hydroxide. In contrast, in order to force the composition (A) type of sols to gel, they must be treated with enough base to raise the pH to 7 to 7.5.

The sols require anywhere from a few hours to several days to gel. Once gelled, the gels must then be dried prior to pyrolysis. The gels are allowed to dry at room temperature or are dried with the application of gentle heat. Care must be taken so that the gels are not dried too fast because this rapid drying results in splits and fractures.

Shortly after gelation, the gels begin to shrink owing to the loss of solvent and water. Control of the loss of volatiles during drying is important. The rate of evaporation of the volatiles should be controlled so as to arrive at the dried state as soon as possible but not so rapidly that the gel splits or fractures. The time period for drying the gels averages from a few days to several weeks. When the gels are at the drying stage where they are handleable, they are heat treated at 60°–250° C. to remove the residual solvents and water. The gels at this point are slightly transluscent and are easy to handle.

The gels can then be pyrolyzed. By "pyrolyzed", it is meant that the gels are heated in an inert atmosphere, or in a vacuum, to elevated temperatures to convert them to glasses or ceramics. By "inert atmosphere", it is meant that the truly inert gases such as, for example, argon or helium can be used. By "elevated temperatures", it is meant 500° C. to 1500° C. Preferred are temperatures of 700° C. to 1200° C. It is best to heat the gel slowly to the elevated temperatures in order to prevent the splitting and fracturing of the gel. Typically, the usually translucent gel begins to turn brown in color as the temperature is raised. At the elevated temperatures, after a short period of time, the gels usually turn black in color. The best approach to the pyrolysis step is to heat the gels in a slow stepwise fashion until the majority of the higher boiling volatiles are gone. For example, the temperature for most articles should be raised to about 300° C. and then the heating should continue until a temperature of about 600° C. is reached and then the temperature can be raised rather rapidly to the ultimate firing temperature. The effect that needs to be accomplished is the removal of the greater portion of any volatiles that are in the article. For most articles, this occurs over about a 300° C. heating range and for the majority of articles prepared from the sol-gels of this process, this range is 300° C. to 600° C. In order to establish the range for any given sol-gel formulation, one can run a thermogravimetric analysis on the material to determine the temperature range at which the majority of volatiles are removed. The time required to heat these materials to remove volatiles and the total time required for pyrolysis to the monolithic glass depends a great deal on the size of the article to be pyrolyzed. The heating and pyrolysis time therefore can range from a few hours to days. The gels thus fired are hard, amorphous and very strong. Their mechanical, thermal and electrical properties at this point are similar to those of fused quartz, and the oxidation resistance of these materials, after pyrolysis, is quite good at elevated temperatures, such as 1000° C.-1250° C.

Advantages of this process are the ability to obtain molecular homogeneity because molecules rather than powders are being blended before gel formation and pyrolysis. High purity of the glasses and ceramics can be achieved because the starting materials can be purified. Objects and articles can be formed at room temperature, including fibers and the like. Lower pyrolysis temperatures, generally, can be used to obtain ceramics and glasses.

These materials and this process can find application in high temperature insulation applications, high strength glasses, composites and ferroelectric materials applications and nuclear waste encapsulation.

The following examples serve to illustrate the invention but should not be construed to limit the invention from what is set forth in the claims.

Firing of the gels was carried out in a Lindeberg three zone tube furnace or an Astro graphite resistance furnace using argon, or helium. All percents are by weight unlss otherwise specified.

EXAMPLE 1

One mole (136 g) of $CH_3Si(OCH_3)_3$ was combined with six moles (108 g) of water and 95 g of methanol in a round-bottomed glass flask, with stirring. The pH of the solution was adjusted from 3.24 to 7.49 using diluted (1 weight %) saturated aqueous ammonium hydroxide solution. The solution was then poured into several one ounce glass vials. A clear white gel was formed within three days in each vial. Approximately 24 hours after gelation, shrinkage of the gel took place, and some of the methanol separated from the gel. At that time, the vial cap was replaced with aluminum foil and a number of holes were made in the foil to regulate the drying of the gel. About three weeks later, 90% of the drying process was done. The gel was then heated at 60° C. for 24 hours and 150° C. for another 24 hours. The dry gel was white translucent, brittle and rigid. Finally, the dry gel was slowly fired to 1200° C. in the presence of the inert gas argon. After firing to 1200° C. the material was black, with density, height and diameter of 1.6 g/cc, 0.65 cm and 0.95 cm, respectively. The weight loss, volume shrinkage and linear shrinkage of the fired gel were 36%, 70%, and 32% respectively. Si, C, and oxygen analyses indicated that the fired dry gel had an empirical formula of $SiO_{1.5}C_{0.5}$.

EXAMPLE 2

A colloidal dispersion was prepared by adding 136 g of methyltrimethoxysilane to 164 g of an aqueous colloidal silica dispersion. This colloidal silica, Nalcoag 1034A, manufactured by Nalco Chemical Co., USA. contains 34 wt % $SiO_2$ of approximately 20 millimicron particle size and has a pH of about 3.2. Upon rapid stirring, a homogeneous phase was obtained and an exotherm was observed. After cooling to room temperature, the colloidal dispersion was split into three portions. The pH of the portions was adjusted to 6.0, 7.0, and 7.5 respectively, with 1.0 weight % saturated aqueous $NH_3$ solution. The colloidal dispersions with pH=6.0, 7.0, and 7.5 gelled in 40, 16, and less than 10 hours, respectively. Gel shrinkage was observed much earlier in the sample of pH=7.5.

Gel samles of pH=7.0, sample B, and 7.5, sample A, were dried at room temperature, or air dried according to the procedures described in Example 1. After drying in air approximately two weeks, the gel samples were heat treated at 60° C. for at least 24 hours and then 150° C. for another 24 hours. The gel made from the pH 7.5 colloidal dispersion fractured, due to thermal stress, much easier than its pH=7.0 counterpart. The heated gels were white translucent, brittle and rigid. Finally, the heated gels were fired to 1200° C. in the presence of helium. The fired gels were black and harder than fused quartz. They scratched glass easily. The results can be found in Table I.

TABLE I

| Sample | pH | Weight Loss | Density (g/cc) | Linear Shrinkage | Volume Shrinkage | Height × Diameter (cm) | Empirical Formula |
|---|---|---|---|---|---|---|---|
| A | 7.5 | 15% | 1.8 | 22% | 51% | 3.6 × 1.5 | $SiO_{2.0}C_{.31}$ |
| B | 7.0 | 13% | 1.9 | 20% | 50% | 3.9 × 1.5 | $SiO_{1.9}C_{.26}$ |

A compression test (ASTM-D-695) was done on a fired gel with a composition similar to Sample B. The compressive strength of that piece of fired gel (height×diameter=1.0×1.5 cm) was 26,000 lbs/in².

EXAMPLE 3

Gels fired to 1200° C. were prepared from colloidal dispersions (sample A of Exmple 2) each with a pH of 7.5 according to the method described in Example 2. These gels had dimensions of approximately 5 cm in height and 0.7 cm in diameter. The weight loss upon firing these samples was about 20%. Three point flexural strength test using ASTM-D-790 was done on two of these samples. The results were about 18,000 lbs/in² for both samples. The volume resistivity and thermal expansion coefficient of these samples were found to be $6 \times 10^{10}$ Ohm-cm and $1.0 \times 10^{-6}$/°C., respectively.

EXAMPLE 4

$C_6H_5Si(OCH_3)_3$ was incorporated into the $CH_3Si(OCH_3)_3$/colloidal $SiO_2$ sol in an attempt to increase the carbon content of the fired gel product. The amounts of $C_6H_5Si(OCH_3)_3$ used are given in Table II.

TABLE II

| Sample | $C_6H_5Si(OCH_3)_3$ | $CH_3Si(OCH_3)_3$ | Colloidal Silica Sol |
|---|---|---|---|
| C | 10g | 90g | 58g |
| D | 10g | 90g | 116g |
| E | 20g | 80g | 56g |
| F | 20g | 80g | 112g |
| G | 30g | 70g | 5.5g |

TABLE II-continued

| Sample | $C_6H_5Si(OCH_3)_3$ | $CH_3Si(OCH_3)_3$ | Colloidal Silica Sol |
|---|---|---|---|
| H | 30g | 70g | 109g |

The compositions of the dry gels in weight percent before firing and the weight loss after firing to 1200° C. in argon are listed in Table III.

TABLE III

| Sample No. | % $C_6H_5SiO_{3/2}$ | % $CH_3SiO_{3/2}$ | % $SiO_2$ | % Weight Loss |
|---|---|---|---|---|
| C | 9 | 63 | 28 | 12 |
| D | 7 | 49 | 44 | 10 |
| E | 18 | 55 | 27 | 10 |
| F | 14 | 44 | 42 | 10 |
| G | 27 | 48 | 25 | 10 |
| H | 21 | 38 | 41 | 10 |

The procedures for making dry gels and final ceramic materials were the same as those described in Examples 1 and 2. The ceramic materials made in Samples D and F were large monolithic glasses, Sample H was weak and powdery. Unfired dry gels from Samples C, E, and G were fractured due to thermal stress. More $SiO_2$ was present in Samples D, F, and H than in Samples C, E, and G. The final formed ceramic materials were hard, amorphous and black.

EXAMPLE 5

In a manner similar to Example 2, the following examples of $SiO_2/CH_3SiO_{3/2}$ where the weight ratio was varied were made from $CH_3Si(OCH_3)_3$ and Nalcoag 1034A. Compositions of the dry gels and % weight loss after firing to 1200° C. are listed in Table IV.

TABLE IV

| Sample No. | % $CH_3SiO_{3/2}$ | % $SiO_2$ | % Weight Loss |
|---|---|---|---|
| I | 80 | 20 | — |
| J | 70 | 30 | — |
| K | 60 | 40 | — |
| L | 55 | 45 | 26 |
| M | 40 | 60 | 11 |
| N | 30 | 70 | 10 |
| O | 20 | 80 | — |
| P | 10 | 90 | 3 |

On the whole, the higher the $SiO_2$ concentration, the less shrinkage and fracture were found in the gel. However, gels having a higher $SiO_2$ content also took longer to dry. At lower $SiO_2$ concentrations, there was much more shrinkage and fracture in the gel.

EXAMPLE 6

In this example, a dry gel of $Al_2O_3$-$CH_3SiO_{3/2}$ was prepared. A colloidal dispersion was prepared by mixing 20 g of methyltrimethoxysilane and 105 g acidic colloidal alumina monohydrate. Colloidal alumina monohydrate containing 20.0 weight % solids was supplied by Nyacol Inc., Ashland, Mass. Upon rapid stirring, a homogeneous phase was obtained and an exotherm was observed. After cooling to room temperature, the pH of the colloidal dispersion was adjusted from 3.2 to 4.2 with 1.0 weight % saturated $NH_3$ solution. A small portion of the colloidal dispersion was poured into a small vial. The dispersion gelled in less than 15 hours and the gel dried in about three weeks. The dry gel containing 68% $Al_2O_3$ and 32% $CH_3SiO_{3/2}$ was fired to 1200° C. in an argon atmosphere. The weight loss upon firing was about 15%. The fired gel (2.5 cm in diameter and 1 cm in thickness) was translucent (greyish-white), very hard and scratched glass easily. X-ray diffraction indicated small size crystallites (less than 100 Angstroms) of $Al_2O_3$ were present in the fired gel. Further firing from 1200° to 1450° C. for 4 hours gave a weight loss of 2% and resulted in no apparent change in shape. The presence of Mullite in the sample was indicated by X-ray diffraction examination.

EXAMPLE 7

66.8 g of zirconia sol which was 19.0 weight percent solids and stabilized by acetate ions, with a pH of 3.8, manufactured by Nyacol, Inc., was mixed with 66.7 g of methyltrimethoxysilane. The mixed colloidal dispersion with pH of about 4.6 gelled in 3 days, and the dry gel was obtained in about three weeks. The dry gel contained 30% $ZrO_2$ and 70% $CH_3SiO_{3/2}$. After firing to 1200° C. in the presence of argon, the dry gel broke into a few small pieces having approximate dimensions of 2 cm × 1 cm, and lost 26% of its original weight. The fired gel is black and hard. A number of pores (1 mm in size) were present on the surface of the fired gels. A piece of the fired gel was further heated at 1000° C. in air for four hours. No apparent change in weight or shape was observed.

EXAMPLE 8

3.3 g of Al(isobutoxy)$_3$ was mixed with 5.10 g $CH_3Si(OCH_3)_3$ and the mixture was shaken 15 minutes. 10.0 g of distilled $H_2O$ with the pH adjusted to 3.0 using acetic acid, was then added and the resultant solution was shaken 60 minutes. The solution formed a milky white gel which was air dried and then dried to 200° C. prior to firing. The dry gel contained 65% $CH_3SiO_{3/2}$ and 35% $Al_2O_3$. The dry gel was fired to 1200° C. in argon and formed a broken piece having a dark grey color. The weight loss after firing was about 20%. X-ray diffraction analysis of the fired material showed it was amorphous.

EXAMPLE 9

In this example, $CH_3Si(OCH_3)_3$ was used in conjunction with n-butyl zirconate. This sample was made by mixing 5.5 g $CH_3Si(OCH_3)_3$ with 2.5 g acetic acid, followed by addition of 3.9 g n-butyl zirconate and finally 5.8 g distilled water. The clear, yellow liquid gelled within 8 days. The gel was air dried and then oven dried to 100° C. prior to being fired. The milky white solid dry gel containing about 68% by weight $CH_3SiO_{3/2}$ and 32% by weight $ZrO_2$ was fired to 1200° C. in helium to give a charcoal black rough solid which retained its shape during firing. The weight loss upon firing was 27%.

EXAMPLE 10

A gel was made by mixing 30 g Ti(isopropoxy)$_4$, 25 g acetic acid, and 25 g $CH_3Si(OCH_3)_3$, followed by addition of 45.5 g acidic colloidal $SiO_2$, Nalcoag 1034A. The cohydrolyzate formed a milky white gel in one day, which was air dried and then oven dried to 100° C. The dry gel had dimensions of 34.5 mm × 32.5 mm × 32.0 mm and contained approximately 43% $SiO_2$, 23% $TiO_2$, and 34% $CH_3SiO_{3/2}$. Upon firing to 1200° C. in helium, the dried gel became charcoal black and very dense. The fired dry gel lost 13 wt % of its original weight and had dimensions of 26.3 mm × 24.9 mm × 25.0 mm. The density of the fired material was 2.0 g/cc.

EXAMPLE II

A zirconia containing gel was made using 30.4 gms of $CH_3Si(OCH_3)_3$; 23 gms of $C_6H_5Si(OCH_3)_3$ and 100 gms of 20 weight percent solids aqueous colloidal zirconia. The mixture was stirred and 10 cc of acetic acid was added. After a short while, the mixture became compatible and cleared. The sol was easy to gel.

EXAMPLE 12

A sol was prepared by combining the following ingredients. $CH_3Si(OCH_3)_3$ (25 gms); $C_6H_5Si(OCH_3)_3$ (20 gms) and thirty grams of water. The mixture warmed slightly upon shaking for ½ hour and some precipitation was observed initially but cleared upon stirring. To this mixture was added 5 drops of acetic acid. The sol was clear and compatible and represents a 50/50 weight ratio of $C_6H_5SiO_{3/2}$ and $CH_3SiO_{3/2}$ in an aqueous-alcoholic sol. This sol can be readily gelled by raising the pH of the sol.

That which is claimed is:

1. A method of preparing a carbon-containing, monolithic glassy ceramic which comprises drying and pyrolyzing at a temperature of 500° C. to 1500° C. in an inert atmosphere, or a vacuum, until a carbon-containing, monolithic glassy ceramic is obtained, a product comprising a stable gel selected from a group consisting essentially of (A) a gel obtained from a sol of an organosilsesquioxane having the unit formula $$RSiO_{3/2}$$

wherein R is selected from a group consisting essentially of
   (a) $CH_2=CH-$;
   (b) $CH_2=CHCH_2-$;
   (c) $C_6H_5-$;
   (d) alkyl radicals of 1 to 4 carbon atoms;
   (e) substituted monovalent organic radicals selected from the group consisting of $CH_2=CHC(CH_3)COO(CH_2)_3-$,

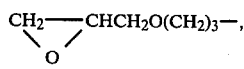

$HS(CH_2)_3-$, $Cl(CH_2)_3-$, and $NH_2(CH_2)_2NH(CH_2)_3-$; and
   (f) mixtures of (a), (b), (c), (d), and (e);

(B) a gel obtained from a mixture of a sol of an organosilsesquioxane from (A), and a colloidal metal oxide or a mixture of colloidal metal oxides selected from a group consisting essentially of
   (i) $SiO_2$
   (ii) $Al_2O_3$
   (iii) $ZrO_2$
   (iv) $TiO_2$
   (v) $SnO_2$
   (vi) $ZrSiO_4$
   (vii) $B_2O_3$
   (viii) $La_2O_3$ and
   (ix) $Sb_2O_5$
   wherein said gel contains at least 10 weight percent of said organosilsesquioxane from (A) based on the total weight of said organosilsesquioxane and said metal oxide;

(C) a gel obtained from a mixture of a sol of an organosilsesquioxanes from (A), and a metal alkoxide, or a mixture of metal alkoxides having the general formula $$M(OR')_x$$

wherein M is any metal from a metal alkoxide which hydrolyzes and polymerizes in the presence of water, R' is an alkyl radical of 1 to 4 carbon atoms and x has a value equivalent to the metal ion valence wherein said gel contains at least about 50 weight percent of said organosilsesquioxane from (A) based on the total weight of said organosilsesquioxane and said metal M in said gel.

2. A method as claimed in claim 1 wherein the silsesquioxane is composed of 20 weight percent of $C_6H_5SiO_{3/2}$ and 80 weight percent of $CH_3SiO_{3/2}$, based on the weight of $CH_3SiO_{3/2}$ and $C_6H_5SiO_{3/2}$.

3. A method as claimed in claim 1 wherein the silsesquioxane is composed of 10 weight percent of $C_6H_5SiO_{3/2}$ and 90 weight percent of $CH_3SiO_{3/2}$, based on the weight of $CH_3SiO_{3/2}$ and $C_6H_5SiO_{3/2}$.

4. A method as claimed in claim 1 wherein the stable gel is (B) and in (B) the colloidal metal oxide is $SiO_2$.

5. A method as claimed in claim 1 wherein the stable gel is (B) and in (B) the colloidal metal oxide is $Al_2O_3$.

6. A method as claimed in claim 1 wherein the stable gel is (B) and in (B) the colloidal metal oxide is $ZrO_2$.

7. A method as claimed in claim 1 wherein the stable gel is (B) and in (B) the colloidal metal oxide is $TiO_2$.

8. A method as claimed in claim 1 wherein the stable gel is (B) and in (B) the colloidal metal oxide is $SnO_2$.

9. A method as claimed in claim 1 wherein the stable gel is (B) and in (B) the colloidal metal oxide is $ZrSiO_4$.

10. A method as claimed in claim 1 wherein the stable gel is (B) and in (B) the colloidal metal oxide is $B_2O_3$.

11. A method as claimed in claim 1 wherein the stable gel is (B) and in (B) the colloidal metal oxide is $La_2O_3$.

12. A method as claimed in claim 1 wherein the stable gel is (B) and in (B) the colloidal metal oxide is $Sb_2O_5$.

13. A method as claimed in claim 4 wherein the silsequioxane is $CH_3SiO_{3/2}$, and the weight ratio of $CH_3SiO_{3/2}$ to $SiO_2$ is 20:80 to 55:45.

14. A method as claimed in claim 5 wherein the silsequioxane is $CH_3SiO_{3/2}$, and the weight ratio of $CH_3SiO_{3/2}$ to $Al_2O_3$ is 85:15 to 30:70.

15. A method as claimed in claim 6 wherein the silsesquioxane is $CH_3SiO_{3/2}$, and the weight ratio of $CH_3SiO_{3/2}$ to $ZrO_2$ is 20:80 to 80:20.

16. A method as claimed in claim 7 wherein the silsesquioxane is $CH_3SiO_{3/2}$, and the weight ratio of $CH_3SiO_{3/2}$ to $TiO_2$ is 99.5:0.5 to 90:10.

17. A method as claimed in claim 4 wherein the silsesquioxane is a combination of $CH_3SiO_{3/2}$ and $C_6H_5SiO_{3/2}$, the colloidal metal oxide is $SiO_2$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $SiO_2$ is 56 to 44.

18. A method as claimed in claim 5 wherein the silsesquioxane is a combination of $CH_3SiO_{3/2}$ and $C_6H_5SiO_{3/2}$, the colloidal metal oxide is $Al_2O_3$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $Al_2O_3$ is 32 to 68.

19. A method as claimed in claim 6 wherein the silsesquioxane is a combination of $CH_3SiO_{3/2}$ and $C_6H_5SiO_{3/2}$, the colloidal metal oxide is $ZrO_2$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $ZrO_2$ is 70 to 30.

20. A method as claimed in claim 7 wherein the stable gel is (B) and the silsesquioxane is a combination of $CH_3SiO_{3/2}$ and $C_6H_5SiO_{3/2}$, the colloidal metal oxide is $TiO_2$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $TiO_2$ is 90 to 10.

21. A method as claimed in claim 1 wherein the stable gel is (C) and in (C) the silsesquioxane is $CH_3SiO_{3/2}$ and the metal alkoxide is $Si(OR')_4$.

22. A method as claimed in claim 1 wherein the stable gel is (C) and in (C) the silsesquioxane is $CH_3SiO_{3/2}$ and the metal alkoxide is $Ti(OR')_4$.

23. A method as claimed in claim 1 wherein the stable gel is (C) and in (C) the silsesquioxane is $CH_3SiO_{3/2}$ and the metal alkoxide is $Al(OR')_3$.

24. A method as claimed in claim 1 wherein the stable gel is (C) and in (C) the silsesquioxane is $CH_3SiO_{3/2}$ and the metal oxide is $Zr(OR')_3$.

25. A method as claimed in claim 1 wherein the stable gel is (C) and in (C) the silsesquioxane is $CH_3SiO_{3/2}$ and the metal alkoxide is $Sn(OR')_4$.

26. A method as claimed in claim 1 wherein the stable gel is (C) and the silsesquioxane is a combination of $CH_3SiO_{3/2}$ and $C_6H_5SiO_{3/2}$ and the metal alkoxide is $Si(OR')_4$.

27. A method as claimed in claim 1 wherein the stable gel is (C) and the silsesquioxane is a combination of $CH_3SiO_{3/2}$ and $C_6H_5SiO_{3/2}$ and the metal alkoxide is $Ti(OR')_4$.

28. A method as claimed in claim 1 wherein the stable gel is (C) and the silsesquioxane is a combination of $CH_3SiO_{3/2}$ and $C_6H_5SiO_{3/2}$ and the metal alkoxide is $Al(OR')_3$.

29. A method as claimed in claim 1 wherein the stable gel is (C) and the silsesquioxane is a combination of $CH_3SiO_{3/2}$ and $C_6H_5SiO_{3/2}$ and the metal alkoxide is $Zr(OR')_3$.

30. A method as claimed in claim 1 wherein the sable gel is (C) and the silsesquioxane is a combination of $CH_3SiO_{3/2}$ and $C_6H_5SiO_{3/2}$ and the metal alkoxide is $Sn(OR')_4$.

31. A method as claimed in claim 26 wherein R' is methyl.

32. A method as claimed in claim 26 wherein R' is ethyl.

33. A method as claimed in claim 27 wherein R' is propyl.

34. A method as claimed in claim 27 wherein R' is butyl.

35. A method as claimed in claim 28 wherein R' is propyl.

36. A method as claimed in claim 28 wherein R' is butyl.

37. A method as claimed in claim 29 wherein R' is propyl.

38. A method as claimed in claim 29 wherein R' is butyl.

39. A method as claimed in claim 30 wherein R' is methyl.

40. A method as claimed in claim 30 wherein R' is ethyl.

41. A method of forming a carbon-containing, monolithic glassy ceramic coating on a solid substrate which comprises (I) coating a solid substrate with a sol selected from a group consisting essentially of (A) a sol of organosilsesquioxane having the unit formula $RSiO_{3/2}$ wherein R is selected from a group consisting essentially of (a) $CH_2=CH-$;
(b) $CH_2=CHCH_2-$;
(c) $C_6H_5-$;
(d) alkyl radicals of 1 to 4 carbon atoms;
(e) substituted monovalent organic radicals selected from the group consisting of $CH_2=CHC(CH_3)COO(CH_2)_3-$,

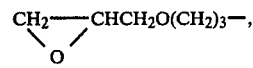

$HS(CH_2)_3-$, $Cl(CH_2)_3-$, and $NH_2(CH_2)_2NH(CH_2)_3-$; and (f) mixtures of (a), (b), (c), (d), and (e);

(B) a mixture of a sol of an organosilsesquioxane from (A), and a colloidal metal oxide or a mixture of colloidal metal oxides selected from a group consisting essentially of (i) $SiO_2$
(ii) $Al_2O_3$
(iii) $ZrO_2$
(iv) $TiO_2$
(v) $SnO_2$
(vi) $ZrSiO_4$
(vii) $B_2O_3$
(viii) $La_2O_3$ and
(ix) $Sb_2O_5$ wherein said gel contains at least 10 weight percent of said organosilsesquioxane from (A) based on the total weight of said organosilsesquioxane and said metal oxide;

(C) a mixture of a sol of an organosilsesquioxane from (A), and a metal alkoxide, or a mixture of metal alkoxides having the general formula $M(OR')_x$ wherein M is any metal from a metal alkoxide which hydrolyzes and polymerizes in the presence of water, R' is an alkyl radical of 1 to 4 carbon atoms and x has a value equivalent to the metal ion valence wherein said gel contains at least about 50 weight percent of said organosilsesquioxane from (A) based on the total weight of said organosilsesquioxane and said metal M in said gel;

(II) gelling the sol while the sol is on the solid substrate;

(III) drying the gel to remove volatile materials;

(IV) heat treating the gel to remove higher boiling volatiles; and (V) pyrolyzing the dried and heat treated gel at a temperature of 500° C. to 1500° C. in an inert atmosphere or a vacuum until a carbon-containing, monolithic glassy ceramic coated substrate is obtained.

42. A method as claimed in claim 41 wherein the silsesquioxane is composed of 20 weight percent of $C_6H_5SiO_{3/2}$ and 80 weight percent of $CH_3SiO_{3/2}$, based on the weight of $CH_3SiO_{3/2}$ and $C_6H_5SiO_{3/2}$.

43. A method as claimed in claim 41 wherein the silsesquioxane is composed of 10 weight percent of

44. A method as claimed in claim 41 wherein the stable gel is (B) and in (B) the colloidal metal oxide is $SiO_2$.

45. A method as claimed in claim 41 wherein the stable gel is (B) and in (B) the colloidal metal oxide is $Al_2O_3$.

46. A method as claimed in claim 41 wherein the stable gel is (B) and in (B) the colloidal metal oxide is $ZrO_2$.

47. A method as claimed in claim 41 wherein the stable gel is (B) and in (B) the colloidal metal oxide is $TiO_2$.

48. A method as claimed in claim 41 wherein the stable gel is (B) and in (B) the colloidal metal oxide is $SnO_2$.

49. A method as claimed in claim 41 wherein the stable gel is (B) and in (B) the colloidal metal oxide is $ZrSiO_4$.

50. A method as claimed in claim 41 wherein the stable gel is (B) and in (B) the colloidal metal oxide is $B_2O_3$.

51. A method as claimed in claim 41 wherein the stable gel is (B) and in (B) the colloidal metal oxide is $La_2O_3$.

52. A method as claimed in claim 41 wherein the stable gel is (B) and in (B) the colloidal metal oxide is $Sb_2O_5$.

53. A method as claimed in claim 44 wherein the silsesquioxane is $CH_3SiO_{3/2}$ and the weight ratio of $CH_3SiO_{3/2}$ to $SiO_2$ is 20:80 to 55:45.

54. A method as claimed in claim 45 wherein the silsesquioxane is $CH_3SiO_{3/2}$ and the weight ratio of $CH_3SiO_{3/2}$ to $Al_2O_3$ is 85:15 to 30:70.

55. A method as claimed in claim 46 wherein the silsesquioxane is $CH_3SiO_{3/2}$ and the weight ratio of $CH_3SiO_{3/2}$ to $ZrO_2$ is 20:80 to 80:20.

56. A method as claimed in claim 47 wherein the silsesquioxane is $CH_3SiO_{3/2}$ and the weight ratio of $CH_3SiO_{3/2}$ to $TiO_2$ is 99.5:0.5 to 90:10.

57. A method as claimed in claim 44 wherein the silsesquioxane is a combination of $CH_3SiO_{3/2}$ and $C_6H_5SiO_{3/2}$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $SiO_2$ is 56 to 44.

58. A method as claimed in claim 45 wherein the silsesquioxane is a combination of $CH_3SiO_{3/2}$ and $C_6H_5SiO_{3/2}$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $Al_2O_3$ is 32 to 68.

59. A method as claimed in claim 46 wherein the silsesquioxane is a combination of $CH_3SiO_{3/2}$ and $C_6H_5SiO_{3/2}$, the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $ZrO_2$ is 70 to 30.

60. A method as claimed in claim 47 wherein the silsesquioxane is a combination of $CH_3SiO_{3/2}$ and $C_6H_5SiO_{3/2}$ the weight ratio of $CH_3SiO_{3/2}$ to $C_6H_5SiO_{3/2}$ is 49 to 7 and the weight ratio of $CH_3SiO_{3/2}$ and $C_6H_5SiO_{3/2}$ to $TiO_2$ is 90 to 10.

61. A method as claimed in claim 41 wherein the stable gel is (C) and in (C) the silsesquioxane is $CH_3SiO_{3/2}$ and the metal alkoxide is $Si(OR')_4$.

62. A method as claimed in claim 41 wherein the stable gel is (C) and in (C) the gel is $CH_3SiO_{3/2}$ and metal alkoxide is $Ti(OR')_4$.

63. A method as claimed in claim 41 wherein the stable gel is (C) and in (C) the gel is $CH_3SiO_{3/2}$ and the metal alkoxide is $Al(OR')_3$.

64. A method as claimed in claim 41 wherein the stable gel is (C) and in (C) the gel is $CH_3SiO_{3/2}$ and the metal alkoxide is $Zr(OR')_3$.

65. A method as claimed in claim 41 wherein the stable gel is (C) and in (C) the gel is $CH_3SiO_{3/2}$ and the metal alkoxide is $Sn(OR')_4$.

66. A method as claimed in claim 41 wherein the solid substrate is metal.

67. A method as claimed in claim 41 wherein the solid substrate is glass.

68. A method as claimed in claim 41 wherein the solid substrate is ceramic.

69. A method as claimed in claim 66 wherein the metal is silicon.

70. A method as claimed in claim 66 wherein the metal is steel.

71. A solid substrate when coated by the method of claim 41.

72. A solid substrate as claimed in claim 71 which is metal.

73. A solid substrate as claimed in claim 71 which is glass.

74. A solid substrate as claimed in claim 71 which is ceramic.

75. A solid substrate as claimed in claim 72 which is aluminum.

76. A solid substrate as claimed in claim 72 which is steel.

77. A method of forming a carbon-containing, monolithic glassy ceramic coating on a solid substrate which comprises
(I) coating a solid substrate with a stable gel selected from a group consisting essentially of
(A) a gel obtained from a sol of an organosilsesquioxane having the unit formula $$RSiO_{3/2}$$

wherein R is selected from a group consisting essentially of
(a) $CH_2\!=\!CH\!-\!$;
(b) $CH_2\!=\!CHCH_2\!-\!$;
(c) $C_6H_5\!-\!$;
(d) alkyl radicals of 1 to 4 carbon atoms;
(e) substituted monovalent organic radicals selected from the group consisting of $CH_2\!=\!CHC(CH_3)COO(CH_2)_3\!-\!$,

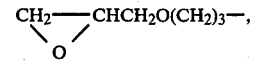

$HS(CH_2)_3\!-\!$, $Cl(CH_2)_3\!-\!$, and $NH_2(CH_2)_2NH(CH_2)_3\!-\!$; and
(f) mixtures of (a), (b), (c), (d), and (e);
(B) a gel obtained from a mixture of a sol of an organosilsesquioxane from (A), and a colloidal metal oxide or a mixture of colloidal metal oxides selected from a group consisting essentially of
(i) $SiO_2$
(ii) $Al_2O_3$
(iii) $ZrO_2$
(vi) $ZrSiO_4$
(vii) $B_2O_3$ (viii) La$_2$O$_3$ and
(iv) TiO$_2$
(v) SnO$_2$
(ix) Sb$_2$O$_5$
wherein said gel contains at least 10 weight percent of said organosilsesquioxane from (A) based on the total weight of said organosilsesquioxane and said metal oxide;
(C) a gel obtained from a mixture of a sol of an organosilsesquioxane from (A), and a metal alkoxide, or a mixture of metal alkoxides having the general formula M(OR')$_x$ wherein M is any metal from a metal alkoxide which hydrolyzes and polymerizes in the presence of water, R' is an alkyl radical of 1 to 4 carbon atoms and x has a value equivalent to the metal ion valence wherein said gel contains at least about 50 weight percent of said organosilsesquioxane from (A) based on the total weight of said organosilsesquioxane and said metal M in said gel;
(II) drying the gel to remove volatile materials;
(III) heat treating the gel to remove higher boiling volatiles; and
(IV) pyrolyzing the dried and heat treated gel at a temperature of 500° C. to 1500° C. in an inert atmosphere or a vacuum until a carbon-containing, monolithic glassy ceramic coated substrate is obtained.

78. A method as claimed in claim 77 wherein the solid substrate is metal.
79. A method as claimed in claim 77 wherein the solid substrate is glass.
80. A method as claimed in claim 77 wherein the solid substrate is ceramic.
81. A method as claimed in claim 78 wherein the metal is silicon.
82. A method as claimed in claim 78 wherein the metal is steel.
83. A solid substrate when coated by the method of claim 77.
84. The solid substrate as claimed in claim 83, which is metal.
85. A composition of matter which is a monolithic glassy ceramic prepared by the method of claim 1.
86. A method of preparing a carbon-containing, monolithic glassy ceramic which comprises drying and pyrolyzing at a temperature of 500° C. to 1500° C. in an inert atmosphere, or a vacuum, until a carbon-containing, monolithic glassy ceramic is obtained, a product comprising a mixture of
(A) a stable gel obtained from a sol of an organosilsesquioxane having the unit formula RSiO$_{3/2}$ wherein R is selected from a group consisting essentially of
(a) CH$_2$=CH—;
(b) CH$_2$=CHCH$_2$—;
(c) C$_6$H$_5$—;
(d) alkyl radicals of 1 to 4 carbon atoms;
(e) substituted monovalent organic radicals selected from the group consisting of CH$_2$=CHC(CH$_3$)COO(CH$_2$)$_3$—,

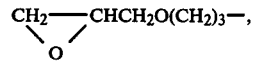

HS(CH$_2$)$_3$—, Cl(CH$_2$)$_3$—, and NH$_2$(CH$_2$)$_2$NH(CH$_2$)$_3$—; and
(f) mixtures of (a), (b), (c), (d), and (e);
(B) a colloidal metal oxide or a mixture of colloidal metal oxides selected from a group consisting essentially of
(i) SiO$_2$
(ii) Al$_2$O$_3$
(iii) ZrO$_2$
(iv) TiO$_2$
(v) SnO$_2$
(vi) ZrSiO$_4$
(vii) B$_2$O$_3$
(viii) La$_2$O$_3$ and
(ix) Sb$_2$O$_5$
wherein said gel contains at least 10 weight percent of said organosilsesquioxane from (A) based on the total weight of said organosilsesquioxane and said metal oxide;
(C) a metal alkoxide, or a mixture of metal alkoxides having the general formula M(OR')$_x$ wherein M is any metal from a metal alkoxide which hydrolyzes and polymerizes in the presence of water, R' is an alkyl radical of 1 to 4 carbon atoms and x has a value equivalent to the metal ion valence, wherein said gel contains at least about 50 weight percent of said organosilsesquioxane from (A) based on the total weight of said organosilsesquioxane and said metal M in said gel.

87. A method as claimed in claim 86 wherein M(OR''')$_y$ is Ti(OC$_3$H$_7$)$_4$ and the colloidal metal oxide is SiO$_2$.
88. A method as claimed in claim 87 wherein the gel is formed from CH$_3$SiO$_{3/2}$.
89. A method as claimed in claim 87 wherein the gel is formed from CH$_3$SiO$_{3/2}$ and C$_6$H$_5$SiO$_{3/2}$.

* * * * *